United States Patent Office 3,561,196
Patented Feb. 9, 1971

3,561,196
DUST COLLECTOR APPARATUS
Karl L. Westlin, Louisville, Ky., assignor to American Air Filter Company, Inc., Jefferson, Ky., a corporation of Kentucky
Filed Mar. 25, 1969, Ser. No. 810,171
Int. Cl. B01d 45/06
U.S. Cl. 55—423                                                 3 Claims

ABSTRACT OF THE DISCLOSURE

Dust collector apparatus of the louvered type wherein a dirty gas stream is originally passed through a converging dirty gas inlet plenum in a flow-through casing, reversed in its directional course in unitary fashion by deflector means to flow into a louvered dirty gas treating plenum and reversed again to its original course as a plurality of separate gas streams through louver passages in the walls of the dirty gas treating plenum.

BACKGROUND OF THE INVENTION

The present invention relates to an improved appartus for gas separation, and more particularly, to a new, useful and unobvious arrangement for separating contaminant particles from a dirty gas stream wherein dust is separated from the stream by passing the same through louvers disposed to abruptly change the direction of flow of the gas stream so as to separate dust particles from such stream.

A number of louvered dust collector arrangements have been provided in the past which can be adapted to various types of conduit systems to operate for removal of the dust particles, and at the same time, provide substantially similar gas flow direction at the inlet and outlet of the conduit systems to permit utilization of substantially straight line flow. For the most part, these past arrangements have been comparatively expensive in construction and operation, and have proven inefficient due to a substantial energy loss in the gas stream during gas cleaning operations.

SUMMARY OF THE INVENTION

The present invention, recognizing that past louvered dust collector arrangements have presented problems in construction, maintenance and high kinetic energy losses, provides a louvered dust collector apparatus which is straightforward and economical in both construction and operation, which permits quick installation in a flow-through conduit system, and which, at the same time, allows minimum kinetic energy losses in the gas stream treated. The present invention can be utilized in various types of conduit systems to operate at high dust separating efficiency, providing for maximum dust particle removal from a dirty stream, and at the same time, providing for substantially similar gas flow direction at the inlet and outlet of the conduit system to permit utilization in flow-through conduit arrangements.

Various other features of the present invention will become obvious to one skilled in the art upon reading the disclosure set forth herein.

More particularly, the present invention provides a dust collector apparatus for separating contaminant particles from a dirty gas stream comprising: a gas flow path defining casing means having spaced substantially aligned and opposed upstream dirty gas inlet means and downstream clean gas outlet means; first wall means disposed in an inclined manner within the casing to define converging dirty gas inlet plenum means extending in a direction from the dirty gas inlet of the casing toward the clean gas outlet of the casing, the converging dirty gas inlet plenum means having a dirty gas outlet at the downstream end thereof; deflector means spaced from and extending transverse the dirty gas outlet of the converging dirty gas inlet plenum to provide diverting gas flow passage means therebetween of substantially uniform cross section to deflect a gas stream to be treated in a direction opposite the general direction of gas flow along the outside of the converging dirty gas plenum means; second wall means disposed within the casing outside the converging dirty gas inlet plenum means in spaced cooperable relation with the first wall means to provide converging gas treating plenum means extending in a direction from the clean gas outlet of the casing toward the dirty gas inlet of the casing, the upstream inlet of the converging gas treating plenum means being in communication with the diverting gas flow passage means; the second wall means having a plurality of spaced passage defining louvers disposed therein, the louvers being so inclined that the spaced passages defined thereby have their upstream portions closer to the dirty gas inlet means of the casing than the downstream portions so that gas flowing in the dirty gas inlet means in the casing is changed a first time opposite its initial direction as a unified gas stream as it passes from the converging dirty gas inlet plenum means to the converging dirty gas treating plenum means by the gas impervious deflector means and is abruptly changed a second time back to its initial direction as several streams as it passes from the converging dirty gas treating plenum means through the spaced passages defined by the louvers to the clean gas outlet of the casing; and dust particle outlet means in communication with the downstream end of the converging dirty gas treating plenum means to receive dust particles therefrom.

It is to be understood that various changes can be made by one skilled in the art in the arrangement, form and construction of the apparatus set forth herein without departing from the scope of spirit of the present invention.

Referring to the drawing.

Figure 1:
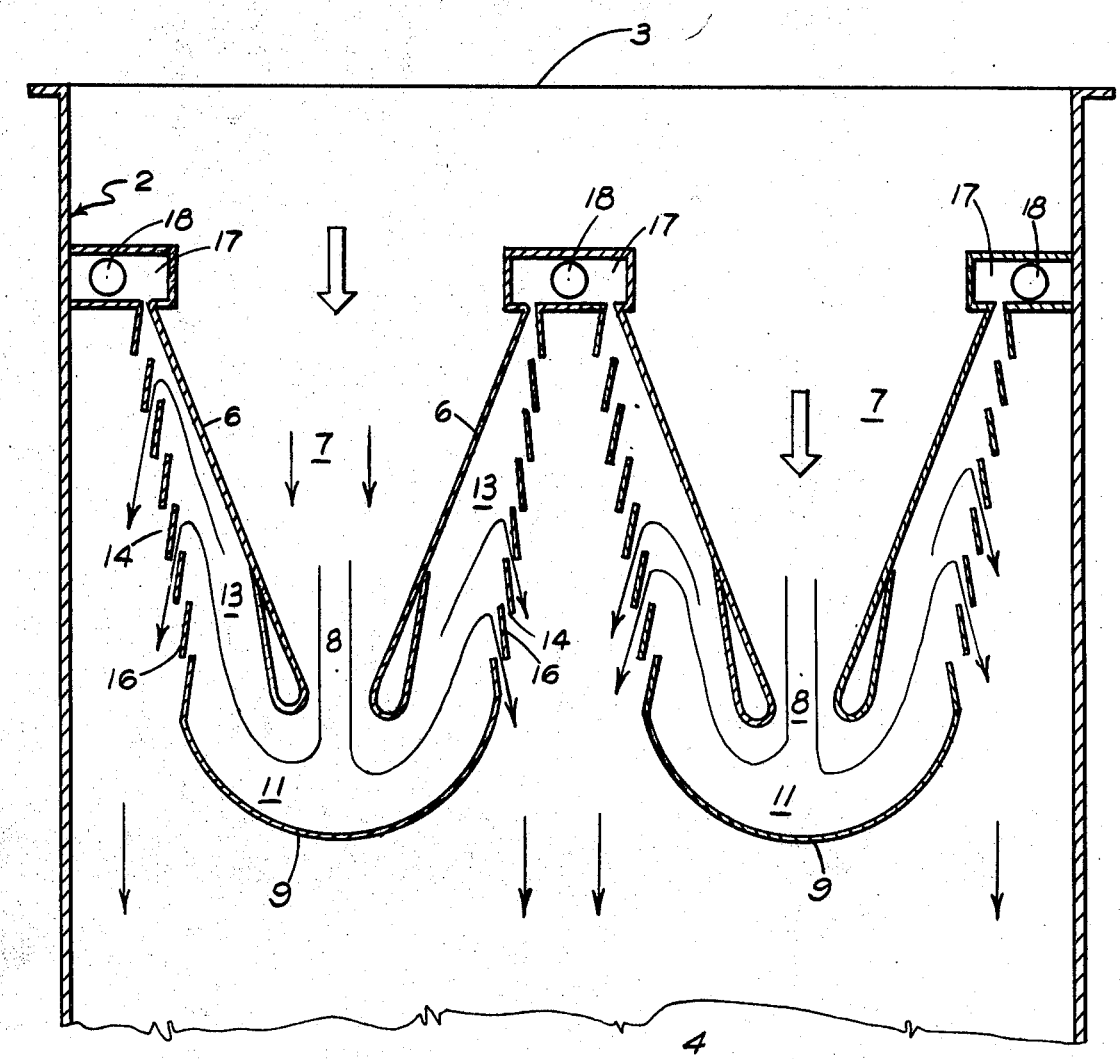
FIG. 1 is a cross-sectional schematic view of a gas flow path-defining casing provided with the novel louvered wall arrangement of the present invention.

As can be seen from the drawing, gas flow path-defining casing 2 includes dirty gas inlet 3 and opposed clean gas optlet 4. Casing 2 can be provided with a suitable prime mover (not shown) in the form of a blower to move the dirty gas stream to be treated therethrough.

Extending lengthwise of casing 2 from dirty gas inlet 3 toward clean gas outlet 4 in converging manner are pairs of opposed gas impervious baffles 6, the opposed baffles 6 defining therebetween converging dirty gas inlet plenums 7 which extend in a direction from the dirty gas inlet 3 of the casing toward the clean gas outlet 4 of the casing. Each of the dirty gas inlet plenums 7 is provided with a dirty gas outlet 8 at the downstream end thereof. Spaced from and extending transverse dirty gas outlet 8 of converging dirty gas inlet plenum 7 is a curved deflector 9, deflector 9 being spaced in such a manner from the end portions of baffles 6 and dirty gas outlet 8 as to provide a diverting gas flow passage 11, therebetween which is substantially uniform in cross section, and which serves to deflect the gas stream to be treated in a direction opposite the general direction of gas flow along the outside of the converging dirty gas inlet plenum.

Figure 2:
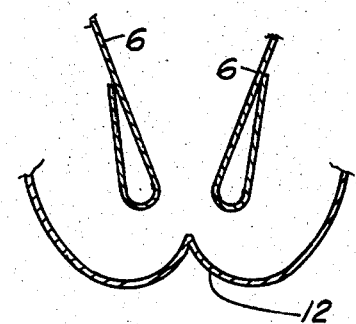
FIG. 2 is a modified arrangement of the deflector means for use in an apparatus similar to that of FIG. 1.

As can be seen in FIG. 2 of the drawing, the gas impervious deflector can be of curved bow-shaped cross section as at 12 so that the gas stream to be treated is deflected its first time as a unified body outside either side of the converging dirty gas inlet plenum, with a minimum kinetic energy loss.

Disposed within casing 2 outside converging dirty gas inlet plenums 7 in spaced cooperable relation with converging baffle 6 so as to provide converging gas treating plenum 13 are pairs of louvered walls 14. It is to be noted that converging gas treating plenums 13 extend in a direction from the clean gas outlet 4 of casing 2 toward dirty gas inlet 3 of the casing, with the upstream inlet of each plenum 13 being in communication with dirty gas flow passage 11. The spaced louvers 16 of walls 14 are so inclined that the spaced passages defined thereby at their upstream portions are closer to the dirty gas inlet 3 of the casing than at their downstream portions.

Accordingly, gas flowing in the dirty gas inlet 3 of casing 2 is abruptly changed a first time in its initial direction as a unified gas stream as it passes from the converging dirty gas inlet plenum to the converging dirty gas treating plenum by the gas impervious deflector means 11. The gas is then abruptly changed a second time back to its initial direction as several streams as it passes from the converging dirty gas treating plenum 13 through the spaced passages defined by the louver 16 to the clean gas outlet 4 of the casing. With this arrangement, the gas is initially turned as a unified body in a passage of substantially uniform cross section so as to provide a minimum of energy loss. At the same time, the gas passes from the converging gas treating plenum 13 in several streams without requiring a turn in an unconfined area as has been required in the past, and thus substantial kinetic energy dissipation is avoided.

Cooperating with converging gas treating plenums 13 at the downstream end thereof are dust particle outlet chambers 17. Dust particle outlet chambers 17 serve to receive dust particles from the converging gas treating plenums 13, the dust particles being carried away from chambers 17 by means of conduits 18 communicating therewith.

In a typical operation, gas to be cleaned is introduced into dirty gas plenum 7 of casing 2 through dirty gas inlet 3 by a blower means which serves to move the gas stream through the casing from dirty gas inlet 3 to clean gas outlet 4. The gas enters into converging dirty gas inlet plenum 7, flows through dirty gas outlet 8 of converging inlet plenum 7, and is turned as a unified body by means of deflectors 9 to enter into converging gas-treating plenums 13. From there the gas is turned again as several streams to be dissipated with minimum kinetic energy loss into the unconfined area adjacent clean gas outlet 4 of casing 2.

The invention claimed is:

1. Dust collector apparatus for separating contaminant particles from a dirty gas stream comprising: a gas flow path defining casing means having a spaced substantially aligned and opposed upstream dirty gas inlet and downstream clean gas outlet; first wall means disposed in an inclined manner within said casing to define a converging dirty gas inlet plenum extending in a direction from said dirty gas inlet of said casing toward said clean gas outlet of said casing, said converging dirty gas inlet plenum having a dirty gas outlet at the downstream end thereof; deflector means spaced from the end portions of said first wall means and said dirty gas outlet of said converging dirty gas inlet plenum and extending transverse said dirty gas outlet of said converging dirty gas inlet plenum to provide a diverting gas flow passage therebetween of substantially uniform cross section to deflect a gas stream to be treated in a direction opposite the general direction of gas flow along the outside of said converging dirty gas inlet plenum; second wall means disposed within said casing outside said converging dirty gas inlet plenum in spaced cooperable relation with said first wall means to provide a converging gas treating plenum therebetween extending in a direction from said clean gas outlet of said casing toward said dirty gas inlet of said casing, the upstream inlet of said converging gas treating plenum being in communication with said diverting gas flow passage; said second wall means having a plurality of space passage-defining louvers disposed therein, said louvers being so inclined that the spaced passages defined thereby have their upstream portions closer to said dirty gas inlet of said casing than the downstream portions so that gas flowing in said dirty gas inlet of said casing is abruptly changed a first time opposite its initial direction as a unified gas stream as it passes from said converging dirty gas inlet plenum to said converging gas treating plenum by said gas deflector means and is abruptly changed a second time back to its initial direction as several streams as it passes from said converging gas treating plenum through said spaced passages defined by said louvers to said clean gas outlet of said casing; and dust particle outlet means in communication with the downstream end of said converging gas treating plenum to receive dust particles therefrom.

2. The apparatus of claim 1, said first wall means comprising at least one pair of opposed gas impervious converging baffles defining said converging gas inlet plenum, said second wall means comprising at least one pair of spaced louvered walls outside said converging dirty gas inlet plenum means and converging with said gas impervious baffles to define a pair of converging gas treating plenum means.

3. The apparatus of claim 2, said gas impervious deflector means being of curved bow-shaped cross section so that the gas stream to be treated is deflected its first time outside either side of said converging dirty gas inlet plenum wih minimum kinetic energy loss.

References Cited

UNITED STATES PATENTS 3,155,474   11/1964   Sexton _____ 55—442X
3,342,024   9/1967   Westlin _____ 55—443

FRANK W. LUTTER, Primary Examiner

V. GIFFORD, Assistant Examiner

U.S. Cl. X.R.

55—443, 461